United States Patent
da Silva

(10) Patent No.: US 10,753,719 B2
(45) Date of Patent: Aug. 25, 2020

(54) ADJUSTMENT DEVICE

(71) Applicant: Kennametal Inc., Latrobe, PA (US)

(72) Inventor: Marcelo Euripedes da Silva, Piracicaba-SP (BR)

(73) Assignee: KENNAMETAL INC., Latrobe, PA (US)

( * ) Notice: Subject to any disclaimer, the term of this patent is extended or adjusted under 35 U.S.C. 154(b) by 175 days.

(21) Appl. No.: 15/879,762

(22) Filed: Jan. 25, 2018

(65) Prior Publication Data

US 2019/0226824 A1    Jul. 25, 2019

(51) Int. Cl.
| | |
|---|---|
| *G01B 3/12* | (2006.01) |
| *B25B 23/00* | (2006.01) |
| *B25B 15/00* | (2006.01) |
| *G01B 7/02* | (2006.01) |
| *G01B 5/02* | (2006.01) |
| *B23B 29/034* | (2006.01) |

(52) U.S. Cl.
CPC .............. *G01B 3/12* (2013.01); *B25B 15/005* (2013.01); *B25B 15/008* (2013.01); *B25B 23/00* (2013.01); *B25B 23/0064* (2013.01); *G01B 5/02* (2013.01); *G01B 7/02* (2013.01); *B23B 29/03414* (2013.01)

(58) Field of Classification Search
CPC ... G01B 3/12; G01B 5/02; G01B 7/02; G01B 3/16; G01B 3/18; G01B 3/22; G01B 3/34; G01B 3/56; G01B 3/20; B25B 15/005; B25B 15/008; B25B 23/00; B25B 23/141; B25B 23/1427; B25B 15/02; B25B 21/00; B25B 23/14; B23B 29/03414
See application file for complete search history.

(56) References Cited

U.S. PATENT DOCUMENTS

| | | | |
|---|---|---|---|
| 2,728,365 A | 12/1955 | Austin | |
| 2,918,834 A | 12/1959 | Cranford | |
| 3,178,969 A | 4/1965 | Yogus et al. | |
| 3,292,678 A * | 12/1966 | Noga | B25B 15/00 81/475 |
| 3,697,187 A | 10/1972 | Faber et al. | |
| 3,885,306 A * | 5/1975 | Herman | B26B 13/22 30/123 |

(Continued)

FOREIGN PATENT DOCUMENTS

| | | |
|---|---|---|
| FR | 1307374 | 10/1962 |
| GB | 2231293 | 12/1992 |
| WO | WO2008151769 | 12/2008 |

*Primary Examiner* — Robert J Scruggs
(74) *Attorney, Agent, or Firm* — Larry R. Meenan

(57) ABSTRACT

A device for adjusting an adjustment mechanism of a cutting tool includes a main body disposed about a longitudinal axis. The main body has a handle portion disposed at or about a first end of the main body which is structured to be gripped by a hand of an operator and a feature structured to engage a correspondingly-shaped feature of the adjustment mechanism disposed at a second end of the main body opposite the first end. The device further includes a first element fixedly coupled to the main body; a second element rotatably coupled to the main body such that the second element is freely rotatable about the longitudinal axis, the second element having a total mass which is disposed unevenly about the longitudinal axis; and an arrangement for determining the relative positioning of the second element in regard to the first element.

24 Claims, 9 Drawing Sheets

(56) References Cited

U.S. PATENT DOCUMENTS

| | | | |
|---|---|---|---|
| 4,091,664 A * | 5/1978 | Zerver | B25B 23/1427 |
| | | | 116/DIG. 1 |
| 4,485,703 A | 12/1984 | Grabovac | |
| 4,626,144 A | 12/1986 | Berner | |
| 4,709,602 A | 12/1987 | Grabovac | |
| 4,786,217 A | 11/1988 | Johne | |
| 5,138,243 A | 8/1992 | Kress | |
| 6,640,674 B1 * | 11/2003 | Rinner | B25B 23/141 |
| | | | 81/473 |
| 8,602,695 B2 | 12/2013 | Bignotto et al. | |
| 8,985,916 B2 | 3/2015 | Kocherovsky et al. | |
| 2007/0084320 A1 | 4/2007 | Frank et al. | |
| 2009/0145268 A1 * | 6/2009 | Laurie | B25B 13/463 |
| | | | 81/60 |
| 2014/0083261 A1 * | 3/2014 | Wang | B25B 23/142 |
| | | | 81/473 |

* cited by examiner

ADJUSTMENT DEVICE

FIELD

The disclosed concept relates to devices for adjusting adjustment mechanisms, such as adjustment mechanisms on precision cutting tools.

BACKGROUND

Cutting tools, such as fine boring heads, commonly rely on adjustment mechanisms which utilize movement of a threaded element. Such movement involves both translation and rotation. More particularly, the precision of the rotation movement of the thread is directly related to the precision of the translation of the cutting element or elements in the cutting head. For example, U.S. Pat. No. 4,786,217 discloses an adjustment device having an adjustment screw which interacts with a wedge in an arrangement for adjusting a cutting tool. As another example, U.S. Pat. No. 3,178,969, discloses an arrangement which utilizes a threaded adjustment sleeve in an arrangement for adjusting a cutting tool. U.S. Pat. Nos. 3,697,187; 8,602,695 and 8,985,916 as well as U.S. Publication No. 2007/0084320 A1 provide further examples of adjustment mechanisms for cutting tools which utilize various threaded arrangements. While such publications provide various adjustment mechanisms for cutting tools, such publications do not provide solutions for achieving accurate rotation of the threaded members therein for use in applications where high levels of precision are required.

SUMMARY

As one aspect of the disclosed concept a device for adjusting an adjustment mechanism is provided. The device comprises a main body disposed about a longitudinal axis. The main body comprises: a handle portion disposed at or about a first end of the main body which is structured to be gripped by a hand of an operator; and a geometric feature structured to engage a correspondingly-shaped feature of the adjustment mechanism disposed at a second end of the main body opposite the first end. The device further comprises: a first element fixedly coupled to the main body; a second element rotatably coupled to the main body such that the second element is freely rotatable about the longitudinal axis, the second element having a total mass which is disposed unevenly about the longitudinal axis; and an arrangement for determining the relative rotational positioning of the second element in regard to the first element about the longitudinal axis.

The first element may comprise a first body having a cylindrically shaped outer surface and the second element may comprise a second body having a cylindrically shaped outer surface.

The arrangement may comprise a plurality of first indicia provided on the outer surface of the first body and a plurality of second indicia provided on the outer surface of the second body.

The second element may comprise a number of voids defined therein which are disposed unevenly about the longitudinal axis.

The second element may comprise a body formed from a first material and an unbalancing mass formed from a second material which is disposed unevenly about the longitudinal axis.

The geometric feature may comprise a Torx or hexagonal bit.

The first element may comprise a thin, disc-shaped element formed from a rigid transparent material having a plurality of non-transparent strips circumferentially spaced on a surface thereof at or about the periphery of the disc-shaped element.

The second element may comprise a housing rotatably coupled to the main body, the housing may include an internal pocket defined therein, and the first element may be disposed in the internal pocket.

The second element may further include a cover which is coupled to the housing and which defines, in-part, the internal pocket.

The housing may be generally cylindrical in shape.

The second element may further comprise an unbalancing mass disposed in the housing such that second element has a total mass which is disposed unevenly about the longitudinal axis.

The second element may further comprise a detection system and a processing unit electrically coupled to the detection system; and the arrangement may comprise the non-transparent strips of the first element and the detection system and the processing unit of the second element.

The detection system may comprise a photo interrupter having a LED emitter positioned on a first side of the disc-shaped element and a LED receiver positioned on an opposite second side of the disc-shaped element such that the non-transparent strips of the first element pass between the LED emitter and the LED receiver when the main body is rotated about the longitudinal axis.

The arrangement may further comprise a display electrically connected to the processing unit and disposed on the housing of the second element.

The arrangement may further comprise a number of tactile buttons electrically connected to the processing unit and disposed on the housing of the second element.

The processing unit may be programmed to determine an angular displacement of the disc-shaped element with respect to the second element.

The processing unit may be further programmed to output the angular displacement on the display.

The processing unit may be further programmed to determine a linear displacement of a cutting portion of a cutting insert which corresponds to the angular displacement of the disc-shaped element with respect to the second element, and wherein the cutting insert is moveably coupled to a main body of a cutting tool via an adjustment assembly having a rotatable adjustment mechanism engaged by the geometric feature of the main body.

The processing unit may be further programmed to output the linear displacement on the display.

It is to be understood that for a given example set forth herein, such example may include at least a portion of the subject matter of one or more of any other examples also set forth herein.

These and other examples are described in greater detail in the detailed description which follows.

BRIEF DESCRIPTION OF THE DRAWINGS

Figure 1:
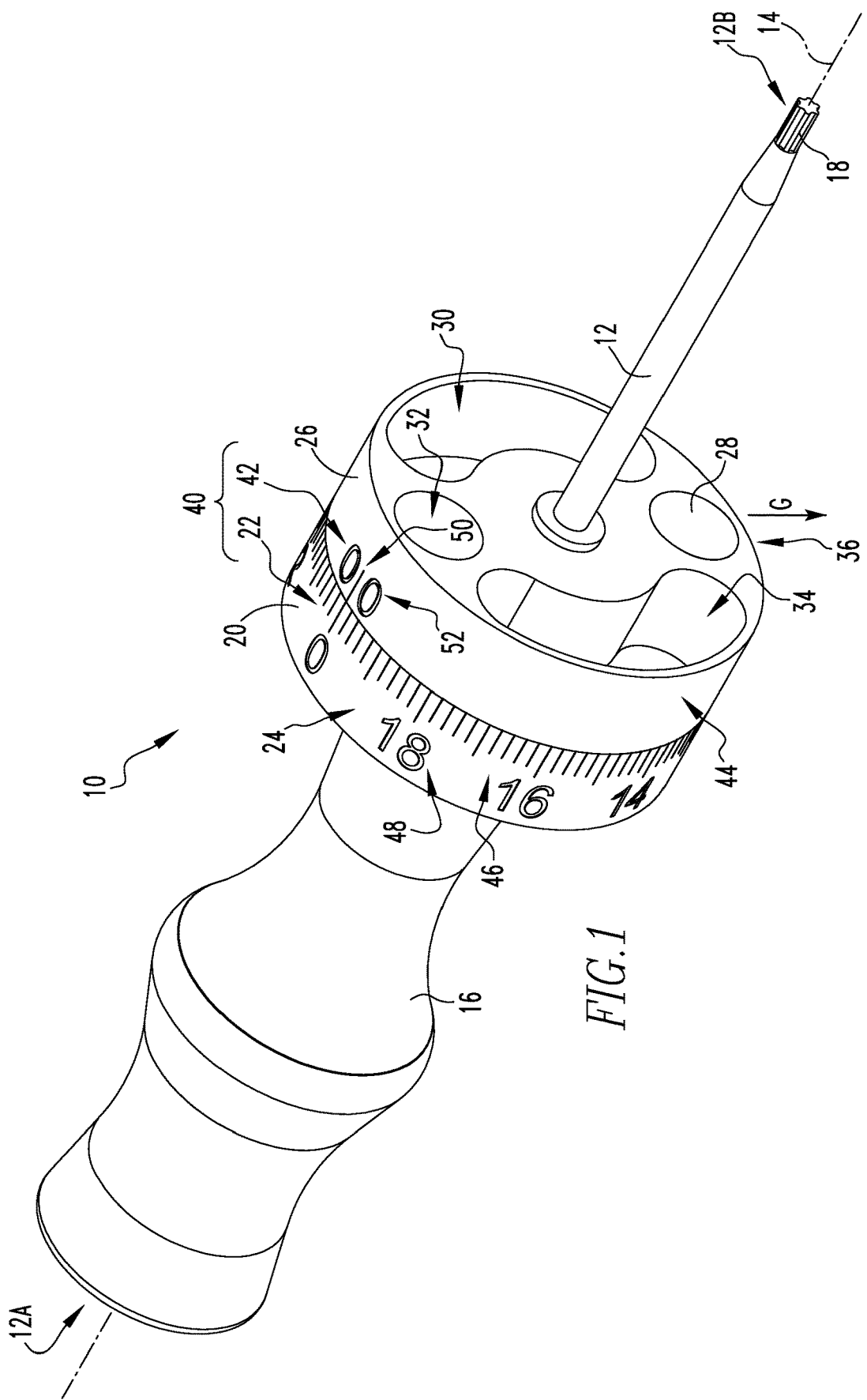

Having thus described examples of the disclosure in general terms, reference will now be made to the accompanying drawings, which are not necessarily drawn to scale, and wherein like reference characters designate the same or similar parts throughout the several views. While various embodiments of the disclosed concept are illustrated, the particular embodiments shown should not be construed to limit the claims. It is anticipated that various changes and modifications may be made without departing from the scope of the disclosed concept.

Figure 2:
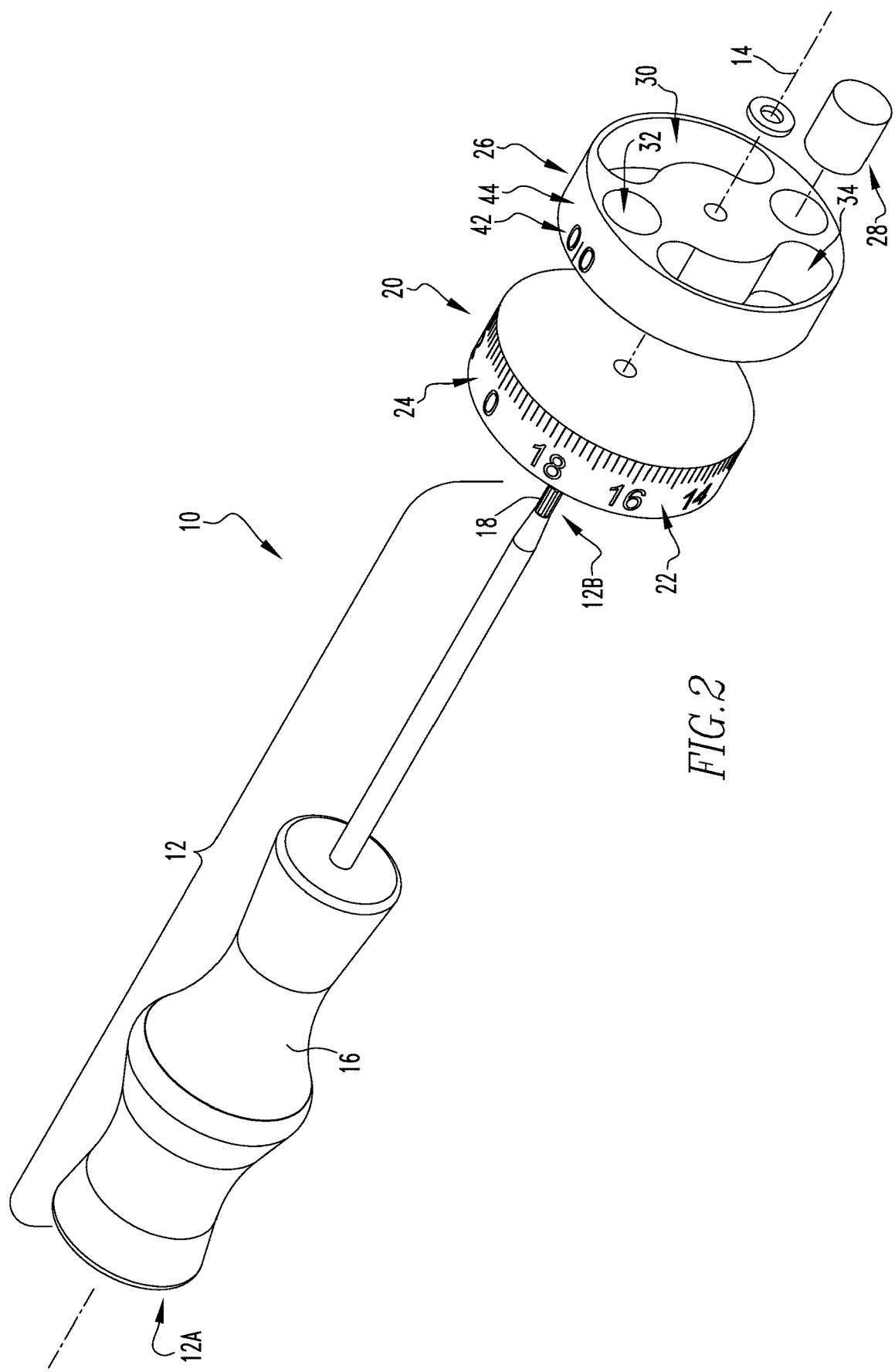
Figure 3:
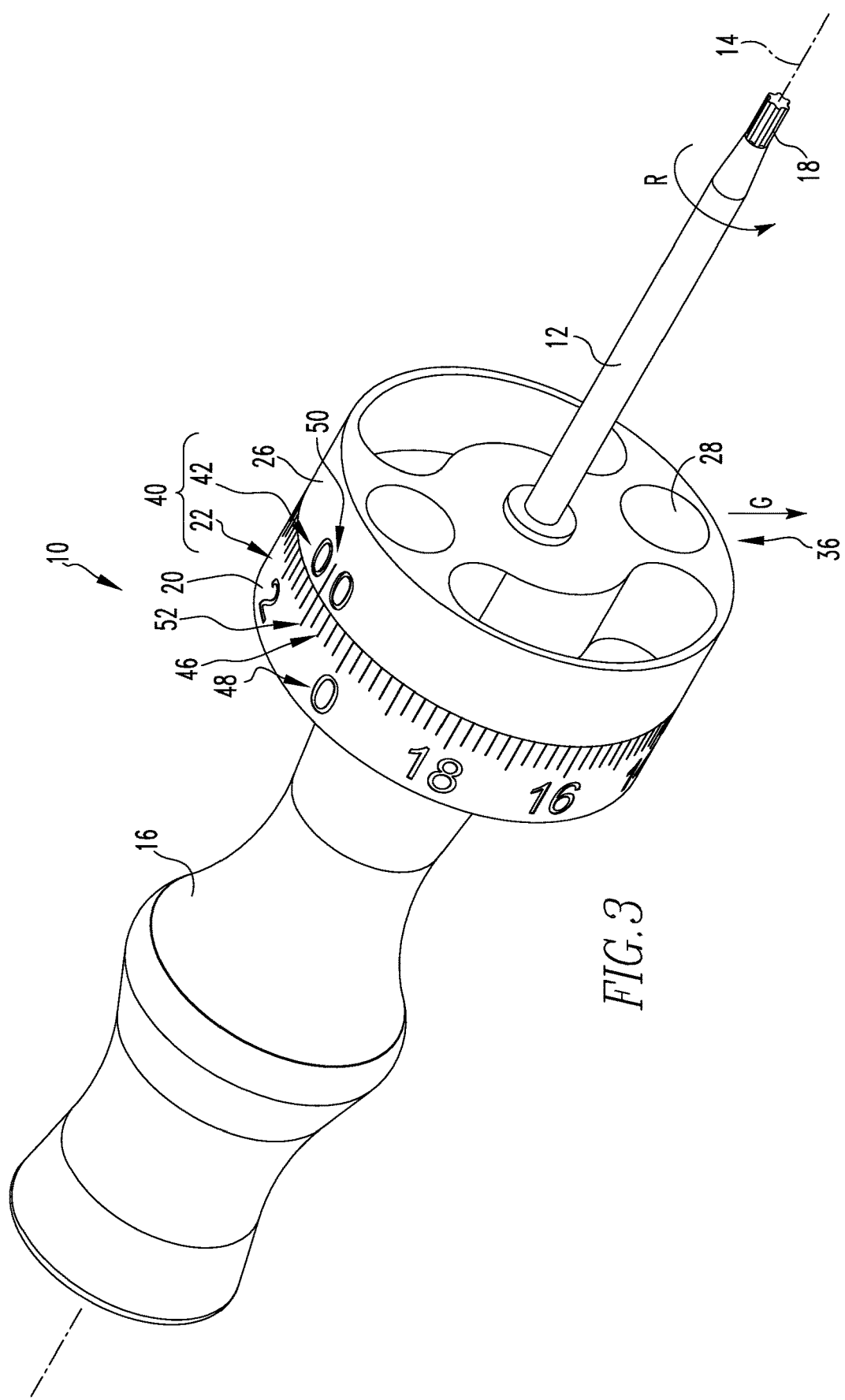
Figure 4:
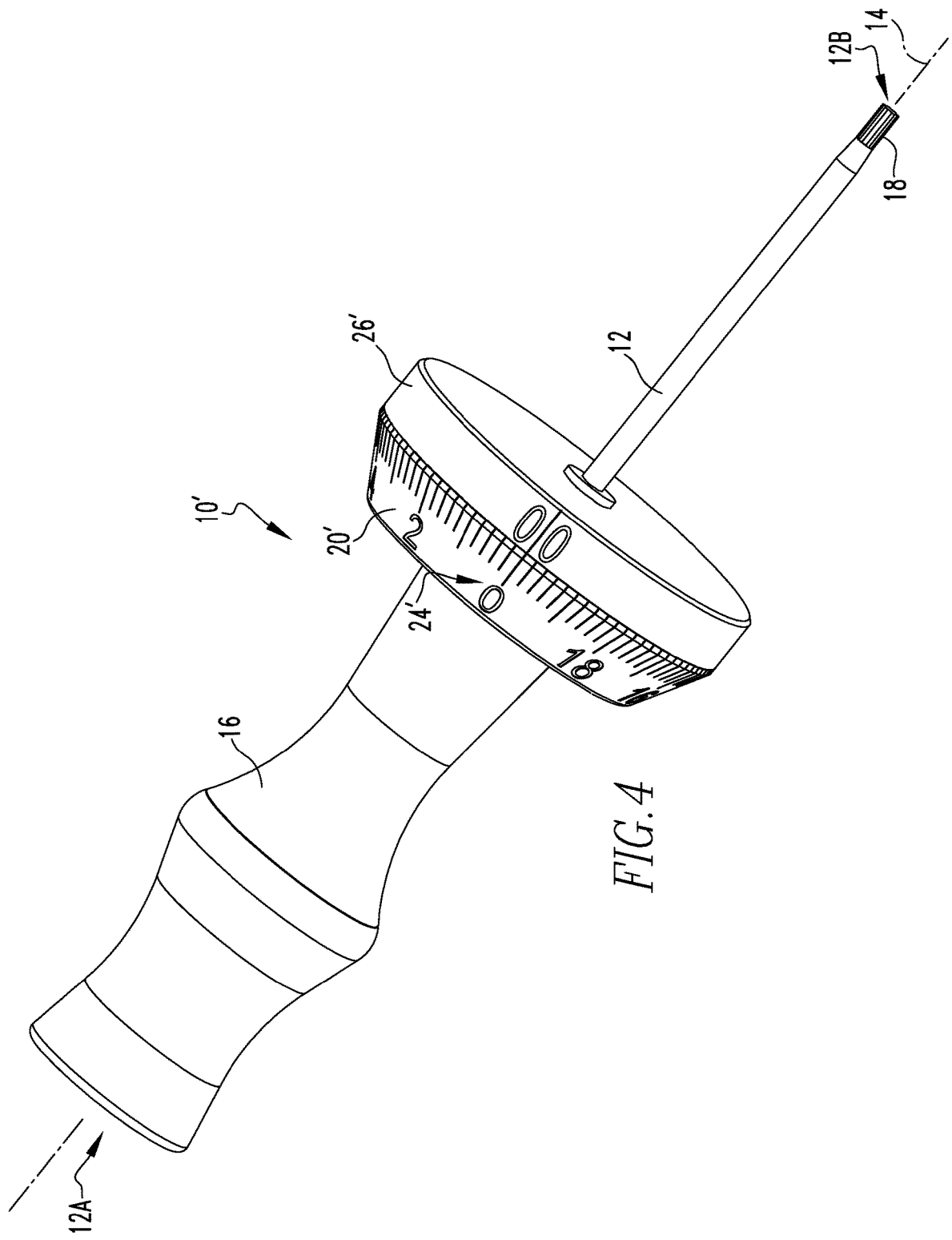
Figure 5:
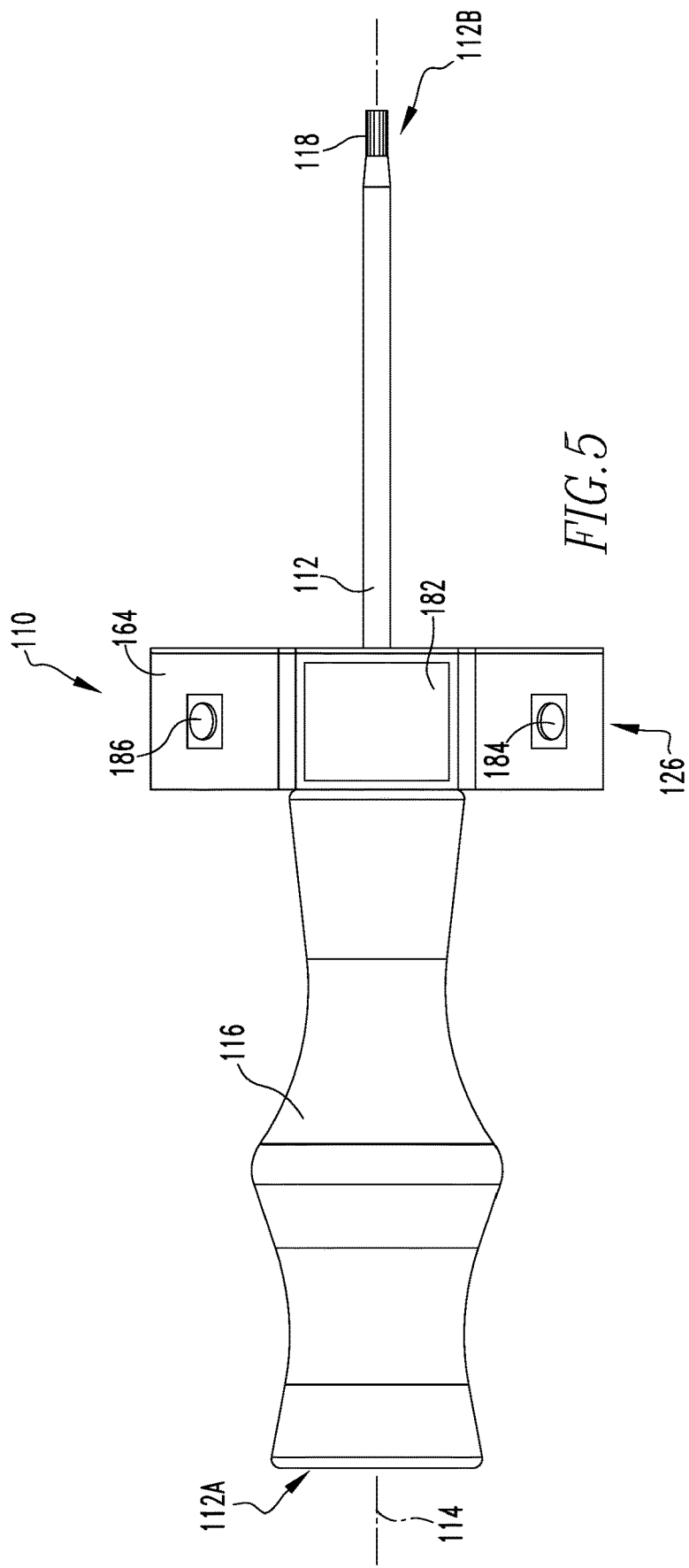
Figure 6:
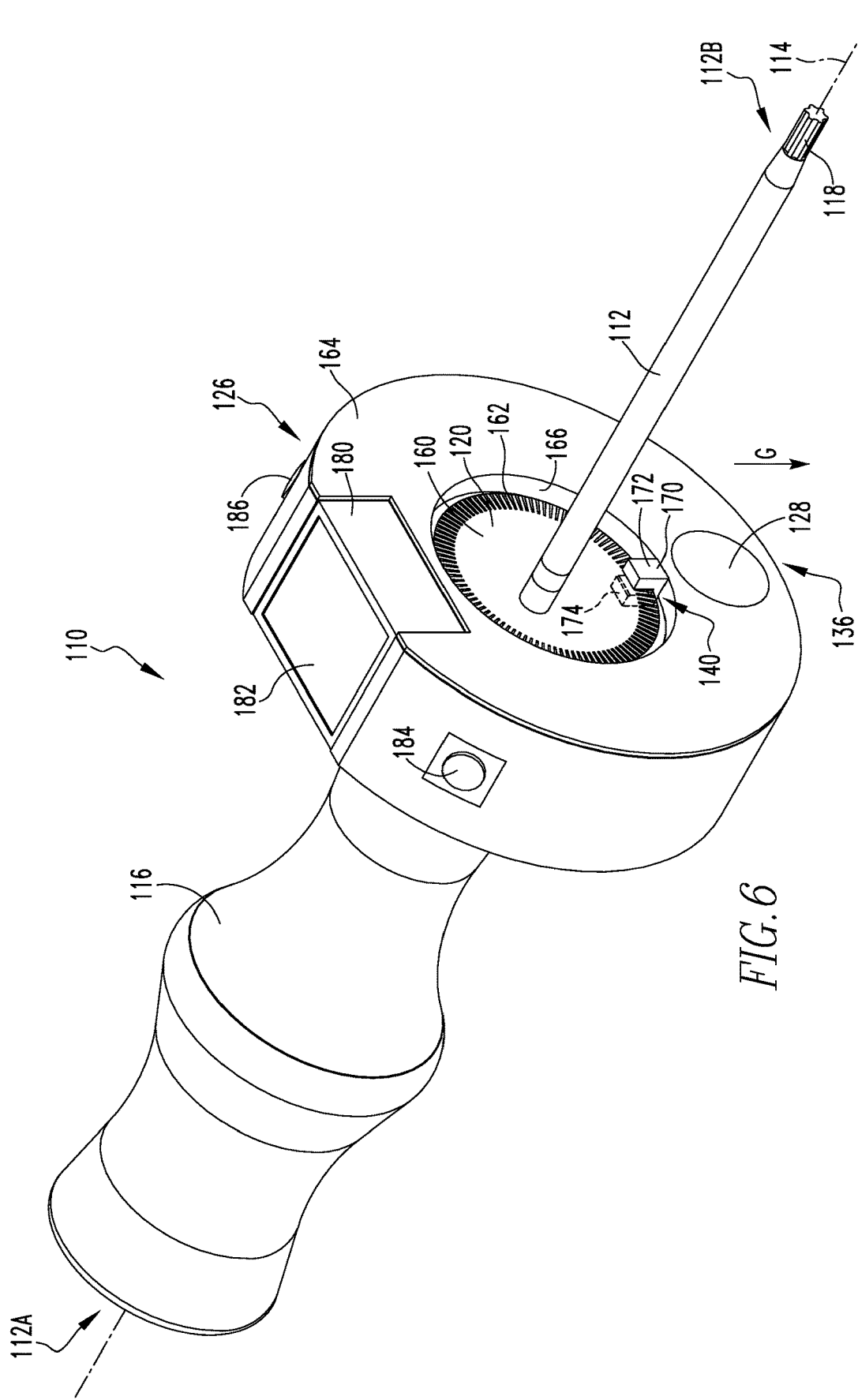
Figure 7:
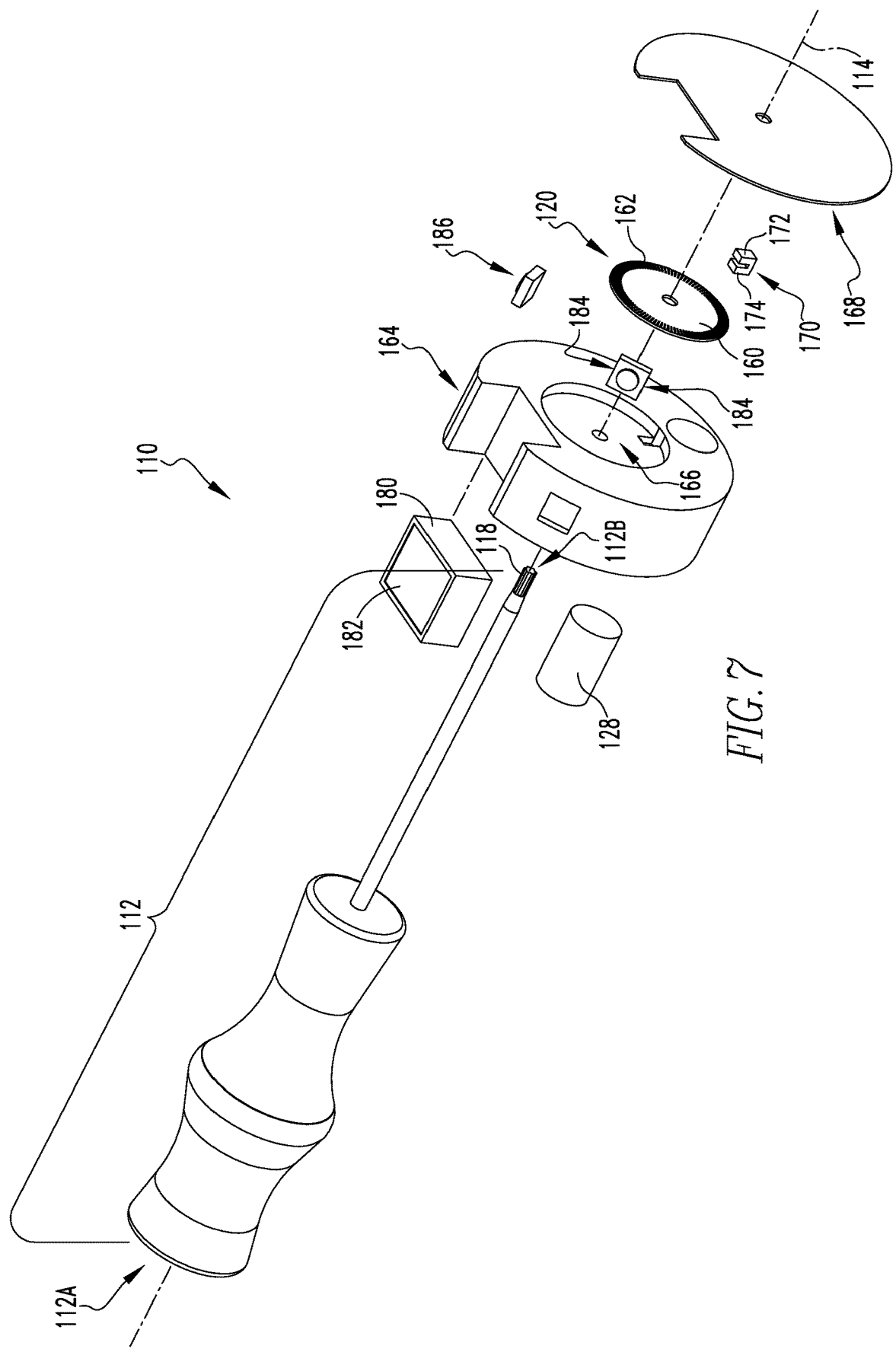
Figure 8:
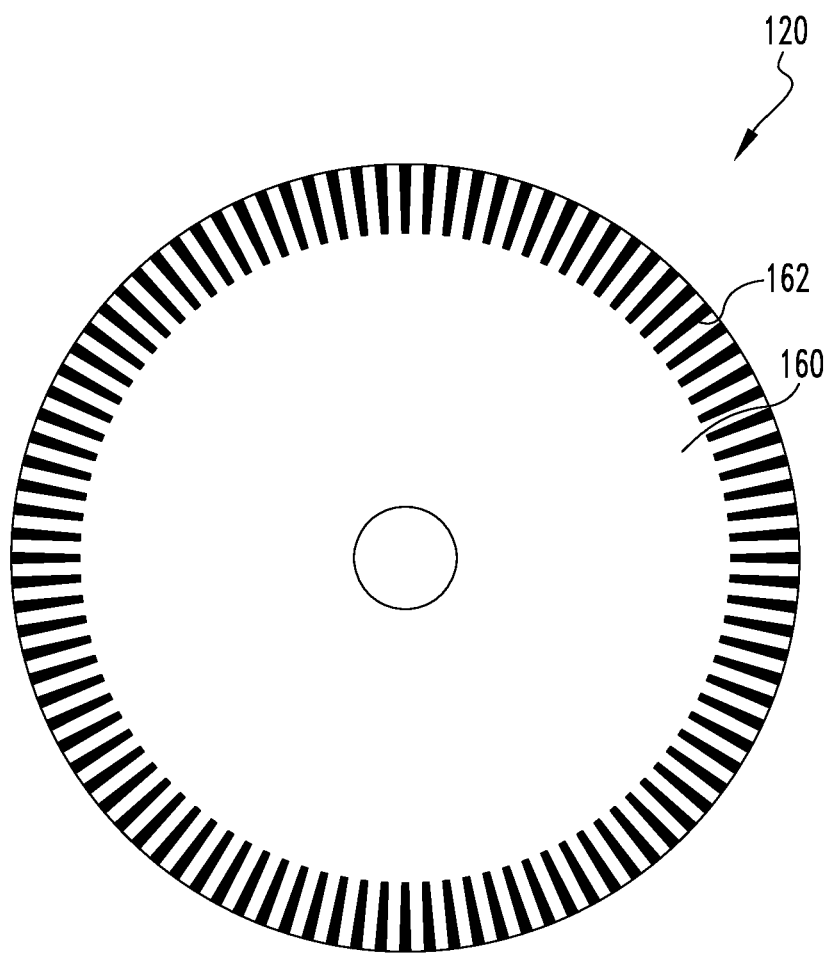

FIG. 1 is an isometric view of an example embodiment of a device for adjusting an adjustment mechanism in accordance with an example embodiment of the disclosed concept shown in a first positioning;

FIG. 2 is an exploded isometric view of the device of FIG. 1;

FIG. 3 is an isometric view of the device of FIG. 1 shown in a second positioning different from the first positioning;

FIG. 4 is an isometric view of an example embodiment of another device similar to that of FIG. 1 in accordance with an example embodiment of the disclosed concept;

FIG. 5 is an elevation view of an example of another embodiment of a device for adjusting an adjustment mechanism in accordance with an example embodiment of the disclosed concept;

FIG. 6 is an isometric view of the device of FIG. 5 shown with a portion removed in order to show details of internal elements;

FIG. 7 is a simplified exploded isometric view of the device of FIG. 5;

FIG. 8 is an elevation view of the encoder disc of the device of FIG. 5; and

Figure 9:
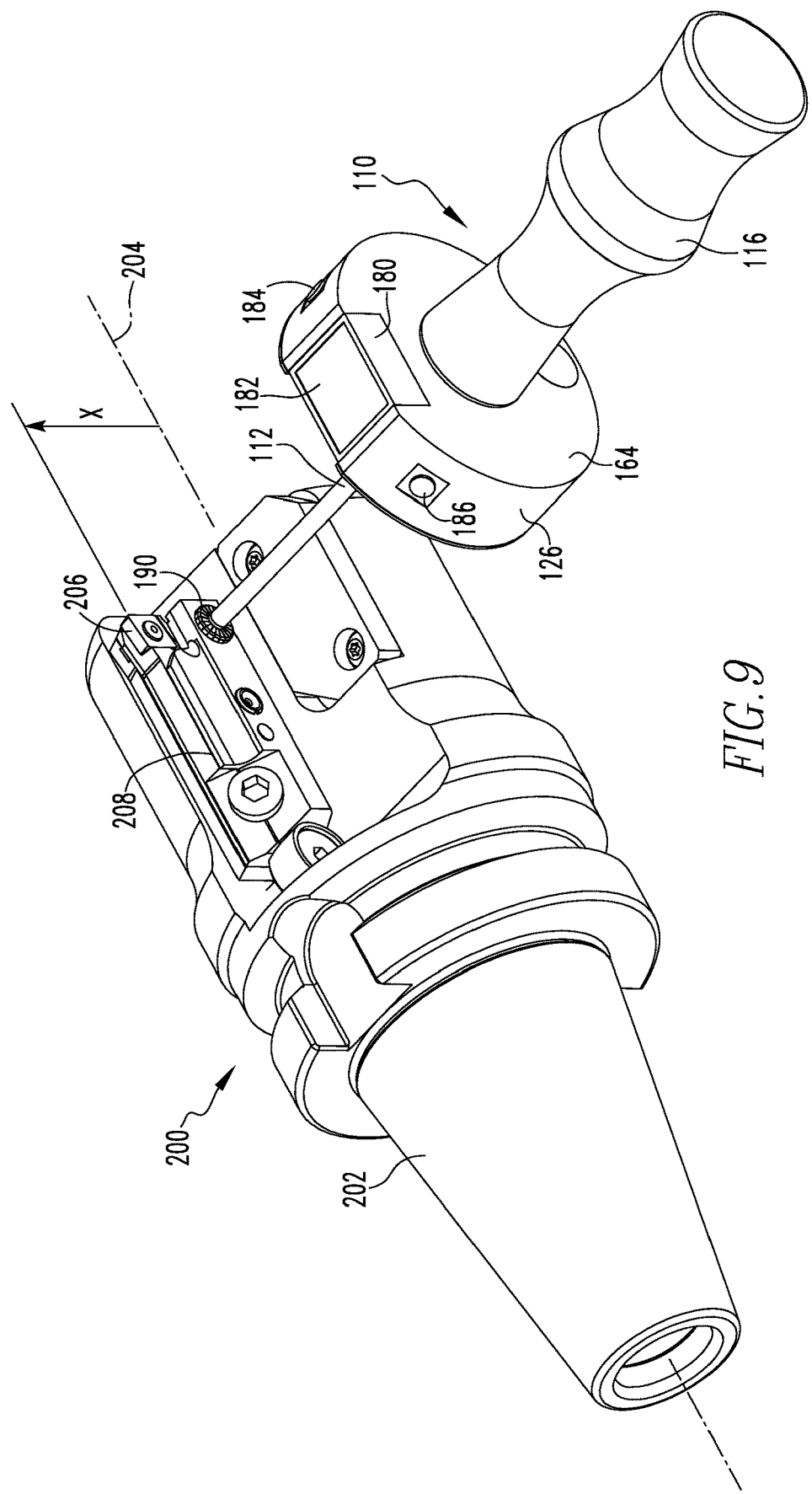

FIG. 9 is an isometric view of the device of FIG. 5 shown engaged with an adjustment mechanism of a rotary cutting too in accordance with an example embodiment of the disclosed concept.

DETAILED DESCRIPTION

Implementations described herein can be understood more readily by reference to the following detailed description and examples and their previous and following descriptions. Elements, apparatus and methods described herein, however, are not limited to the specific implementations presented in the detailed description and examples. It should be recognized that these implementations are merely illustrative of the principles of the present disclosure. Numerous modifications and adaptations will be readily apparent to those of skill in the art without departing from the spirit and scope of the present disclosure.

Whenever the term "about" or "approximately" is used herein or in the appended claims to modify the dimensions of a feature of an implementation of the present disclosure, it is to be construed as referring to the parameters related to the relevant feature. Whenever a range is used herein or in the appended claims to describe dimensions, temperatures, times, amounts, or the like relating to a feature of an aspect of the present disclosure, the range is to be construed as including the stated end points of the range and every point therebetween.

As used herein, the term "number" shall be used to refer to any non-zero quantity.

As used herein, "coupled" refers to two or more components which are secured, via any suitable means, together.

As used herein, "selectively coupled" refers to a coupling of two or more components in which the components may be readily uncoupled and recoupled without damage to the components.

As used herein, "fixedly coupled" refers to two or more components which are coupled in a manner such that their positioning relative to each other is fixed.

As used herein, "rotatably coupled" refers to two or more components which are coupled in a manner such that at least one of the components is rotatable with respect to the other.

FIG. 1 is an isometric view of an example embodiment of a device 10 in accordance with an example embodiment of the disclosed concept for adjusting a rotatable adjustment mechanism of a cutting tool (not shown) such as used in performing metal cutting operations. Referring to FIG. 1, as well as FIG. 2 which shows an exploded isometric view of device 10 of FIG. 1, device 10 includes a main body 12 disposed about a central longitudinal axis 14. Main body 12 includes a handle portion 16 disposed at or about a first end 12A of main body 12. Handle portion 16 may be formed from plastic, wood, metal, or other suitable material and is shaped so as to be readily gripped by a hand of an operator (not shown) of device 10. Main body 12 further includes a geometric feature 18 disposed at a second end 12B of main body 12 opposite first end 12A. Geometric feature 18 may be in the form of a Torx bit, such as illustrated, a hexagonal or Hexagon bit, or any other suitable arrangement which is sized and structured to engage a correspondingly-shaped feature of the adjustment mechanism of a cutting tool. Geometric feature 18 may be formed as an integral portion of main body 12 or as a removable component, similar to a multi-purpose screwdriver in which difference driving bits may be swapped in order to accommodate a particular application. It is thus to be appreciated that main body 12 is generally formed similarly to and functions in a similar manner as a conventional Torx screwdriver.

Continuing to refer to FIGS. 1 and 2, device 10 further includes a first element 20 which is fixedly coupled to main body 12. Therefore, when main body 12 is rotated about longitudinal axis 14, such as rotated by an operator grasping handle 16, first element 20 rotates therewith. First element 20 is generally cylindrical in shape and may be formed from a metal, rigid plastic, or other suitable material. First element 20 includes a plurality of first indicia, shown generally as 22, which are provided on an outer surface 24 of first element 20 via any suitable means (e.g., without limitation, etching, printing, etc.). The purpose of such indicia 22 is discussed in further detail below. Although shown as being generally cylindrical in shape, it is to be appreciated that first element 20 may be of other suitable shape without varying from the scope of the disclosed concept.

Device 10 further includes a second element 26 which is rotatably coupled to main body 12 such that second element 26 is freely rotatable with respect to main body 12 and first element 20 about longitudinal axis 14. Conversely, main body 12 and first element 20 are freely rotatable with respect to second element 26. Second element 26 is generally cylindrical in shape and may be formed from a metal, rigid plastic, or other suitable material. Second element 26 is formed such that it has a total mass which is disposed unevenly about longitudinal axis 14 in a predetermined manner. Such uneven distribution of the mass of second element 26 may be accomplished in several ways without varying from the scope of the disclosed concept. For example, in the example illustrated in FIGS. 1 and 2, second element 26 includes an unbalancing mass 28 formed from a material having a higher density than the surrounding material from which generally the remainder of second element 26 is formed. As another example, in the example illustrated in FIGS. 1 and 2 second element includes a number (three are shown) of voids 30, 32 and 34 defined in second element 26 which may be employed to selectively cause the total mass of second element 26 to be unbalanced about longitudinal axis 14. In another example, either an unbalancing mass 28 or a number of voids 30, 32, 34 may be employed to form second element 26 in a manner such that the total mass thereof is unevenly distributed about longitudinal axis 14 and thus is unbalanced about longitudinal axis 14.

Second element 26 is provided with such uneven distribution of mass so that a predetermined portion, shown generally at 36 of second element 26 will be disposed on the very bottom of second element due to the forces of the Earth's gravity, such as shown by arrow G, acting on second element 26 (which is freely rotatable about main body 12 and thus longitudinal axis 14 such as previously discussed). From such arrangement it is thus to be appreciated that second element 26 acts as a stationary reference which may be employed to determine a rotational displacement of main portion 12 and first element 20 about longitudinal axis 14, and thus the rotational displacement of an adjustment mechanism engaged and rotated by feature 18 of device 10.

Device 10 further includes an arrangement 40 (FIG. 1) in order to determine the relative rotational positioning of main body 12 and first element 20 with respect to second element 26 about longitudinal axis 14. In the example embodiment illustrated in FIGS. 1 and 2, arrangement 40 includes first indicia 22 of first element 20 as well as a plurality of second indicia, shown generally as 42, which are provided on an outer surface 44 of second element 26 via any suitable means (e.g., without limitation, etching, printing, etc.). In the example embodiment illustrated in FIGS. 1 and 2, first indicia 22 includes a plurality of longitudinal lines 46 which are circumferentially spaced about first element 20 as well as numerical indicators 48 which are also circumferentially spaced about first element 20, whereas second indicia 42 includes a longitudinal line 50 as well as numerical indicators 52. It is to be appreciated that arrangement 40 shown in FIGS. 1 and 2 is provided for exemplary purposes only and that such arrangement may be varies and/or other suitable arrangements may be employed without varying from the scope of the disclosed concept. For example, without limitation, the placement of first indicia 22 and second indicia 42 may generally be reversed (i.e., first indicia 22 positioned on second element 26 and second indicia 42 positioned on first element 20).

Having thus described the basic components of device 10, an example of how device 10 may be employed in adjusting an adjustment mechanism (not shown) will now be provided in conjunction with FIGS. 1 and 3. Referring first to FIG. 1, device 10 is shown with main body 12 and rigidly coupled first element 20 disposed in a first rotational positioning with respect to second element 26. In such first positioning, the "0" indication of first indicia 22 is aligned with longitudinal line 50 of second indicia 42 of second element 26, thus indicating that device 10 is in a 0-0 position. It is to be appreciated that device 10 is generally arranged in such first positioning by rotating main body 12 until the "0" indication of first indicia 22 is aligned with longitudinal line 50 of second indicia 42 of second element 26 (as second element is generally stationary due to the forces of gravity G acting on the unbalanced mass of second element 26, such as previously discussed) thus "zeroing" arrangement 40.

Once disposed in such first positioning, feature 18 is engaged with the corresponding structure of the adjustment mechanism which is to be adjusted. Main body 12 (and along with it the corresponding structure of the adjustment mechanism) is then rotated a desired amount, as determined by arrangement 40, about longitudinal axis 14, in a direction such as shown by arrow R in FIG. 3, to the second positioning shown in FIG. 3. In moving from the first positing of FIG. 1 to the second positioning of FIG. 3, main body 12 was rotated 18° about longitudinal axis 14 as determined by the alignment of the longitudinal line 52 of longitudinal lines 46 which indicates 18° with longitudinal line 50 of second indicia 42 of second element 26 (i.e., in the illustrated example there are 100 longitudinal lines 46, thus a rotational displacement of five of such lines=5 (360°/100)=18°). It is also to be appreciated that arrangement 40 may also be utilized without "zeroing" arrangement 40 simply by first noting the rotational first positioning indicated by arrangement 40 (whatever it may be) when feature 18 is initially engaged with the adjustment mechanism and then determining what the final positioning indicated by arrangement 40 is to be based on the desired rotation of main body 12.

An example embodiment of another device 10' similar to that of FIGS. 1-3 in accordance with an example embodiment of the disclosed concept is shown in FIG. 4. Device 10' is generally similarly arranged and functions similarly as device 10 with a couple subtle variations. One variation is that first element 20' of device 10' includes an outer surface 24' which is generally tapered (i.e., angled with respect to longitudinal axis 14). Another variation is that second element 26' does not include any voids formed therein but instead only includes a biasing mass (not numbered) which is wholly contained therein, and thus not visible in the view of FIG. 4.

An example embodiment of yet another device 110 and components thereof for use in adjusting an adjustment device in accordance with the disclosed concept is illustrated in FIGS. 5-9. Referring first to FIGS. 5-7, like devices 10 and 10' previously discussed, device 110 includes a main body 112 disposed about a central longitudinal axis 114. Main body 112 includes a handle portion 116 disposed at or about a first end 112A of main body 112. Handle portion 116 may be formed from plastic, wood, metal, or other suitable material and is shaped so as to be readily gripped by a hand of an operator (not shown) of device 110. Main body 112 further includes a geometric feature 118 disposed at a second end 112B of main body 112 opposite first end 112A. Geometric feature 118 may be in the form of a Torx bit, such as illustrated, a hexagonal or Hexagon bit, or any other suitable arrangement which is sized and structured to engage a correspondingly-shaped feature of the adjustment mechanism of a cutting tool. Geometric feature 118 may be formed as an integral portion of main body 112 or as a removable component, similar to a multi-purpose screwdriver in which difference driving bits may be swapped in order to accommodate a particular application. It is thus to be appreciated that main body 112 is generally formed similarly to and functions in a similar manner as a conventional Torx screwdriver.

Continuing to refer to FIGS. 5-7 as well as FIG. 8, similar to devices 10 and 10', device 110 further includes a first element 120 which is fixedly coupled to main body 112, and thus rotates about longitudinal axis 114 along with main body 112. Unlike the examples previously discussed, first element 120 is formed as an encoder disc which includes a thin disc-shaped element 160 formed from a rigid transparent material (e.g., without limitation, a plastic) having a plurality of non-transparent strips 162 circumferentially spaced on a surface thereof at or about the periphery of disc-shaped element 160. Strips 162 may be formed from etching or any other suitable method which forms non-transparent regions in or on disc-shaped element 160.

Device 110 further includes a second element 126 which, similar to devices 10 and 10', is rotatably coupled to main body 112 such that second element 126 is freely rotatable with respect to main body 112 and first element 120 about longitudinal axis 114. Conversely, main body 112 and first element 120 are freely rotatable with respect to second element 126. Second element 126 includes a frame or housing 164 which is generally cylindrical in shape and is rotatably coupled to main body 112. Housing 164 may be formed from a metal, rigid plastic, or other suitable material. Second element 126 includes an unbalancing mass 128 disposed in housing 164 such that second element 126 has a total mass which is disposed unevenly about longitudinal axis 114 in a predetermined manner. It is to be appreciated that such uneven distribution of the mass of second element 126 may also be accomplished via other means such as described herein without varying from the scope of the disclosed concept. Like second elements 26 and 26' previously discussed, second element 126 is provided with such uneven distribution of mass so that a predetermined portion, shown generally at 136 (FIG. 6) of second element 126 will be disposed on the very bottom of second element due to the forces of the Earth's gravity, such as shown by arrow G, acting on second element 126 (which is freely rotatable about main body 112 and thus longitudinal axis 114 such as previously discussed). From such arrangement it is thus to be appreciated that second element 126 acts as a stationary reference which may be employed to determine a rotational displacement of main portion 112 and first element 120 about longitudinal axis 114, and thus the rotational displacement of an adjustment mechanism engaged and rotated by feature 118 of device 110.

As shown in FIGS. 6 and 7, housing 164 includes an internal pocket 166 defined therein which is sized and positioned to house first element 120 therein. Second element 126 further includes a cover 168 which is coupled to housing 164 and which defines, in-part, internal pocket 166.

Like devices 10 and 10', device 110 further includes an arrangement, a substantial portion of which is shown at 140 (FIG. 6), which is provided to determine the relative rotational positioning of main body 112 and first element 120 (which is rigidly coupled thereto) with respect to second element 126 about longitudinal axis 114. In the example embodiment illustrated in FIGS. 6 and 7, arrangement 140 includes strips 162 of first element 120 as well as a detection system 170 which is electrically connected to a processing unit 180. Detection system 170 and processing unit 180 are provided as portions of second element 126. In an example embodiment detection system 170 is a photo interrupter which includes a LED (light-emitting-diode) emitter 172 which is positioned on a first side of disc 160 and a LED receiver 174 which is positioned on a second side of disc 160 opposite LED emitter 172 such that strips 162 are positioned between LED emitter 172 and LED receiver 174. Processing unit 180 includes a processing portion which may be, for example, a microprocessor, a microcontroller or some other suitable processing device, and a memory portion that may be internal to the processing portion or operatively coupled to the processing portion and that provides a storage medium for data and software executable by the processing portion. In the example shown in FIGS. 5-9, output from processing unit may be provided on a display 182 (e.g., without limitation, an LCD or other suitable display) which is electrically connected to processing unit 180 and disposed on housing 164 of second element 126.

From the foregoing arrangement it is thus to be appreciated that rotation of disc 160 with respect to second element 126 and detection system 170 thereof creates light pulses which are produced when the transparent region between strips 162 of disc 160 are aligned between LED transmitter 172 and LED receiver 174. Such light pulses are counted by processing unit 180, which is programmed with the necessary conversion information to convert the quantity of counted pulses into a corresponding angular displacement of disc 160 (and thus main body 112) with respect to second element 126. Such angular displacement may then be displayed on display 182. Arrangement 110 may include a number (two are shown in the illustrated example) of tactile buttons 184, 186 which are electrically connected to processing unit 180 and disposed on housing 164 of second element 126. Such buttons 184, 186 may be utilized to turn display 182 off or on, to zero the counting function of processing unit 180, or to provide other indications to processing unit 180 as desired.

FIG. 9 is an isometric view showing an example arrangement wherein device 110 is engaged with a rotatable adjustment mechanism 190 of a rotary cutting tool 200 in accordance with an example embodiment of the disclosed concept. Rotary cutting tool 200 includes a main body 202 which is structured to be rotated about a rotational axis 204. Cutting tool 200 further includes a cutting insert 206 which is moveably coupled to main body 202 via an adjustment assembly 208. Adjustment assembly 208 is structured such that the cutting radius X defined by the distance a cutting edge (not numbered) of cutting insert 206 is displaced from the rotational axis 204 may be selectively adjusted a predetermined amount upon a corresponding predetermined rotation of adjustment mechanism 190. In such arrangement, processing unit 180 of device 110 may be programmed to calculate the linear movement of cutting insert 206 corresponding to a detected angular displacement of handle 116 of main body 112 with respect to second element 126 and further provide such linear value to an operator of device 110 via display 182.

From the foregoing examples it is thus to be appreciated that the disclosed concept provides adjustment devices which allow for precision adjustment of adjustment mechanisms at a generally low-cost.

Various implementations of the present disclosure have been described in fulfillment of the various objectives of the present disclosure. It should be recognized that these implementations are merely illustrative of the principles of the present disclosure. Moreover, although the foregoing descriptions and the associated drawings illustrate examples in the context of certain example combinations of elements and/or functions, numerous modifications and adaptations thereof will be readily apparent to those skilled in the art without departing from the spirit and scope of the present disclosure.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

I claim:

1. A device for adjusting an adjustment mechanism, the device comprising:
   a main body disposed about a longitudinal axis, the main body comprising:
      a handle portion disposed at or about a first end of the main body which is structured to be gripped by a hand of an operator; and
      a geometric feature structured to engage a correspondingly-shaped feature of the adjustment mechanism disposed at a second end of the main body opposite the first end;
   a first element fixedly coupled to the main body;
   a second element rotatably coupled to the main body such that the second element is freely rotatable about the longitudinal axis, the second element having a total mass which is distributed unevenly about the longitudinal axis;
   wherein the second element comprises:
      one or more voids defined within an outer periphery of the second body and disposed unevenly about the longitudinal axis, wherein the one or more voids cause the total mass of the second element to be unbalanced about the longitudinal axis; and/or
      a body formed from a first material and an unbalancing mass formed from a second material, the unbalancing mass being disposed unevenly about the longitudinal axis, wherein the second material has a higher density than the first material;
   wherein the uneven distribution of the total mass of the second element results in the second element remaining rotationally stationary upon rotational displacement of the main portion; and
   an arrangement for determining the relative rotational positioning of the second element in regard to the first element about the longitudinal axis.

2. The device of claim 1, wherein the second element has a generally cylindrically shaped outer surface.

3. The device of claim 2, wherein the arrangement comprises a plurality of first indicia provided on the outer surface of the first body and a plurality of second indicia provided on the outer surface of the second body.

4. The device of claim 2, wherein the first element has a generally cylindrically shaped outer surface.

5. The device of claim 1, wherein the second element comprises the one or more voids.

6. The device of claim 1, wherein the second element comprises the body formed from a first material and the unbalancing mass formed from the second material.

7. The device of claim 6, wherein the second element comprises the one or more voids.

8. The device of claim 7, wherein the one or more voids comprise a plurality of voids.

9. The device of claim 1, wherein the geometric feature comprises a Torx or Hexagon bit.

10. The device of claim 1, wherein the first element comprises a thin, disc-shaped element formed from a rigid transparent material having a plurality of non-transparent strips circumferentially spaced on a surface thereof at or about the periphery of the disc-shaped element.

11. The device of claim 10, wherein the second element comprises a housing rotatably coupled to the main body, wherein the housing includes an internal pocket defined therein, and wherein the first element is disposed in the internal pocket.

12. The device of claim 11, wherein the second element further includes a cover which is coupled to the housing and which defines, in-part, the internal pocket.

13. The device of claim 11, wherein the housing is generally cylindrical in shape.

14. The device of claim 11, wherein the second element further comprises an unbalancing mass disposed in the housing such that second element has a total mass which is disposed unevenly about the longitudinal axis.

15. The device of claim 11, wherein the second element further comprises a detection system and a processing unit electrically coupled to the detection system; and wherein the arrangement comprises the non-transparent strips of the first element and the detection system and the processing unit of the second element.

16. The device of claim 15, wherein the detection system comprises a photo interrupter having a LED emitter positioned on a first side of the disc-shaped element and a LED receiver positioned on an opposite second side of the disc-shaped element such that the non-transparent strips of the first element pass between the LED emitter and the LED receiver when the main body is rotated about the longitudinal axis.

17. The device of claim 16, wherein the arrangement further comprises a display electrically connected to the processing unit and disposed on the housing of the second element.

18. The device of claim 17, wherein the arrangement further comprises a number of tactile buttons electrically connected to the processing unit and disposed on the housing of the second element.

19. The device of claim 17, wherein the processing unit is programmed to determine an angular displacement of the disc-shaped element with respect to the second element.

20. The device of claim 19, wherein the processing unit is further programmed to output the angular displacement on the display.

21. The device of claim 19, wherein the processing unit is further programmed to determine a linear displacement of a cutting portion of a cutting insert which corresponds to the angular displacement of the disc-shaped element with respect to the second element, and wherein the cutting insert is moveably coupled to a main body of a cutting tool via an adjustment assembly having a rotatable adjustment mechanism engaged by the geometric feature of the main body.

22. The device of claim 21, wherein the processing unit is further programmed to output the linear displacement on the display.

23. The device of claim 1 wherein, via gravity, the uneven distribution of mass of the second element results in the second element remaining rotationally stationary upon rotational displacement of the main portion.

24. A device for adjusting an adjustment mechanism, the device comprising:
- a main body disposed about a longitudinal axis, the main body comprising:
  - a handle portion disposed at or about a first end of the main body which is structured to be gripped by a hand of an operator; and
  - a geometric feature structured to engage a correspondingly-shaped feature of the adjustment mechanism disposed at a second end of the main body opposite the first end;
- a first element fixedly coupled to the main body;
- wherein the first element comprises a thin, disc-shaped element formed from a rigid transparent material having a plurality of non-transparent strips circumferentially spaced on a surface thereof at or about the periphery of the disc-shaped element;
- a second element rotatably coupled to the main body such that the second element is freely rotatable about the longitudinal axis, the second element having a total mass which is distributed unevenly about the longitudinal axis;
- wherein the uneven distribution of the total mass of the second element results in the second element remaining rotationally stationary upon rotational displacement of the main portion;
- wherein the second element comprises a housing rotatably coupled to the main body, wherein the housing includes an internal pocket defined therein, and wherein the first element is disposed in the internal pocket; and
- an arrangement for determining the relative rotational positioning of the second element in regard to the first element about the longitudinal axis.

* * * * *